(12) United States Patent
Oh et al.

(10) Patent No.: US 11,872,980 B2
(45) Date of Patent: Jan. 16, 2024

(54) METHOD FOR CONTROLLING WHEEL SLIP OF VEHICLE

(71) Applicants: HYUNDAI MOTOR COMPANY, Seoul (KR); KIA MOTORS CORPORATION, Seoul (KR)

(72) Inventors: Ji Won Oh, Hwaseong-si (KR); Jeong Soo Eo, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 333 days.

(21) Appl. No.: 16/701,347

(22) Filed: Dec. 3, 2019

(65) Prior Publication Data
US 2021/0039630 A1    Feb. 11, 2021

(30) Foreign Application Priority Data

Aug. 8, 2019  (KR) ......................... 10-2019-0096433

(51) Int. Cl.
  *B60W 30/02*  (2012.01)
  *B60W 10/18*  (2012.01)
  *B60W 10/06*  (2006.01)

(52) U.S. Cl.
  CPC ............ *B60W 30/02* (2013.01); *B60W 10/06* (2013.01); *B60W 10/18* (2013.01);
  (Continued)

(58) Field of Classification Search
  CPC ... B60T 8/00; B60T 17/10; B60T 8/17; B60T 8/17558; B60T 8/176; B60T 8/1761; B60T 8/175; B60T 8/4809; B60T 8/1701; B60T 8/489; B60T 8/48; B60T 8/1755; B60T 8/17551; B60T 8/17552; B60T 8/17554; B60T 8/17555; B60T 8/17557; B60T 8/1769; B60T 2270/10; B60T 2270/602; B60T 8/268; B60T 2201/16; B60K 28/16;
  (Continued)

(56) References Cited

U.S. PATENT DOCUMENTS

| | | | | |
|---|---|---|---|---|
| 4,773,500 A | * | 9/1988 | Naito ................. | B60K 23/0808 180/233 |
| 2002/0107617 A1 | * | 8/2002 | Tomikawa ......... | B60K 23/0808 903/917 |

(Continued)

*Primary Examiner* — Hunter B Lonsberry
*Assistant Examiner* — Harrison Heflin
(74) *Attorney, Agent, or Firm* — Morgan, Lewis & Bockius LLP

(57) ABSTRACT

A method for controlling wheel slip of a vehicle, which comprises a plurality of driving devices for generating driving force for driving the vehicle, includes: obtaining, by a controller, equivalent inertia information for each driving device based on operation information of each driving system during traveling of the vehicle; calculating, by the controller, a calibration amount for calibrating a driving force command or a braking force command for each wheel in real time by using the equivalent inertia information obtained; calibrating, by the controller, the driving force command or the braking force command for each wheel by using the calculated calibration amount; and controlling, by the controller, the driving force according to the calibrated driving force command or the braking force according to the calibrated braking force command.

16 Claims, 7 Drawing Sheets

(52) U.S. Cl.
CPC ..... *B60W 2520/28* (2013.01); *B60W 2540/10* (2013.01); *B60W 2720/26* (2013.01)

(58) Field of Classification Search
CPC ..... F16D 2500/3118; F16D 2500/5075; F16D 2500/50816; B60W 2520/26; B60W 2720/26; B60W 30/18172; B60W 2540/10; B60W 2540/103; B60W 2540/12; B60W 30/00; B60W 30/02; B60W 10/06; B60W 10/18; B60W 2520/28; B60G 2800/21; B60G 2800/212; B60G 2800/213; B60G 2800/214; B60G 2800/215; B60G 2800/95; B60G 2800/952; B60G 2800/954; B60G 2400/39; B60G 2800/92; B60G 2800/94; B60Y 2300/18175; B62D 6/007; B60L 3/108; B60Q 1/448; B60R 2021/01311; F02N 2200/0805

See application file for complete search history.

(56) References Cited

U.S. PATENT DOCUMENTS

| | | | |
|---|---|---|---|
| 2003/0010559 A1* | 1/2003 | Suzuki | B60K 28/16 180/233 |
| 2017/0174192 A1* | 6/2017 | Ying | B60W 30/18 |
| 2018/0162349 A1* | 6/2018 | Chang | B60W 40/10 |
| 2018/0186352 A1* | 7/2018 | Goto | B60W 50/0098 |
| 2018/0281760 A1* | 10/2018 | Watanabe | B60T 8/268 |
| 2019/0276023 A1* | 9/2019 | Kikuchi | B60W 30/188 |

* cited by examiner

[FIG. 1]
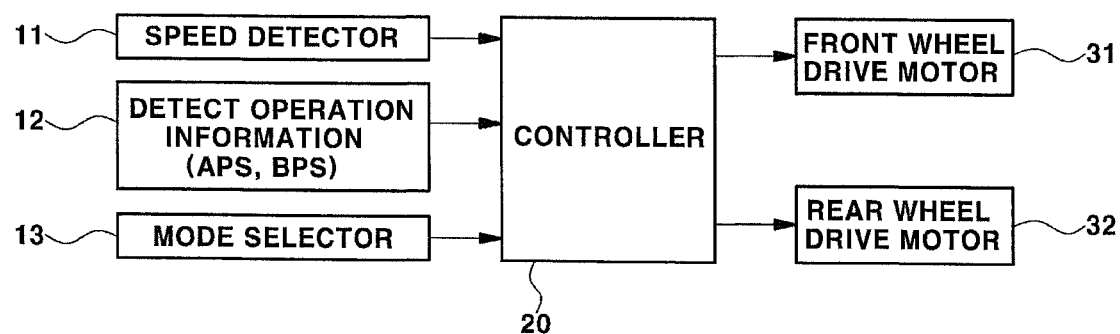

[FIG. 2]
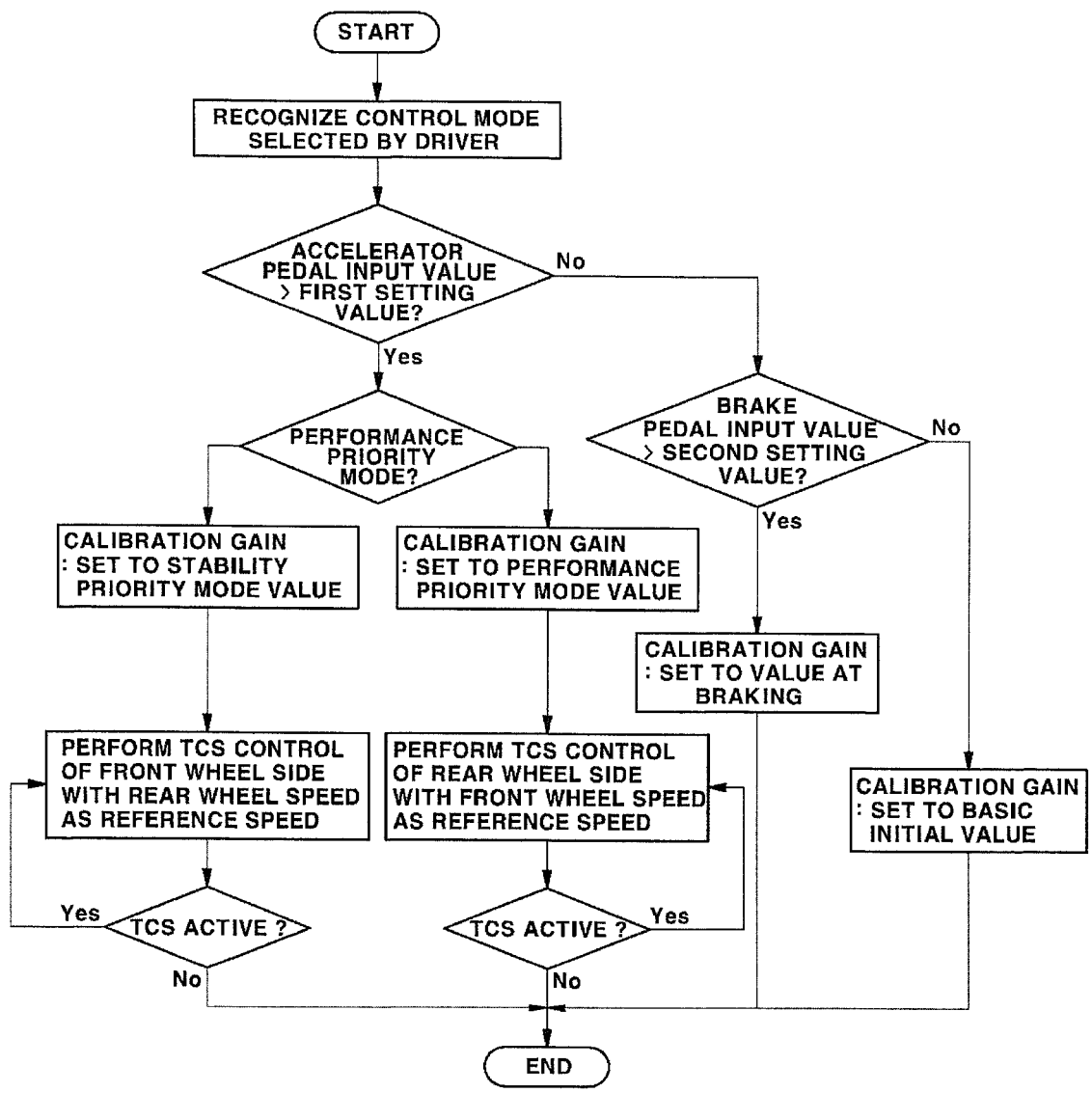

[FIG. 3]
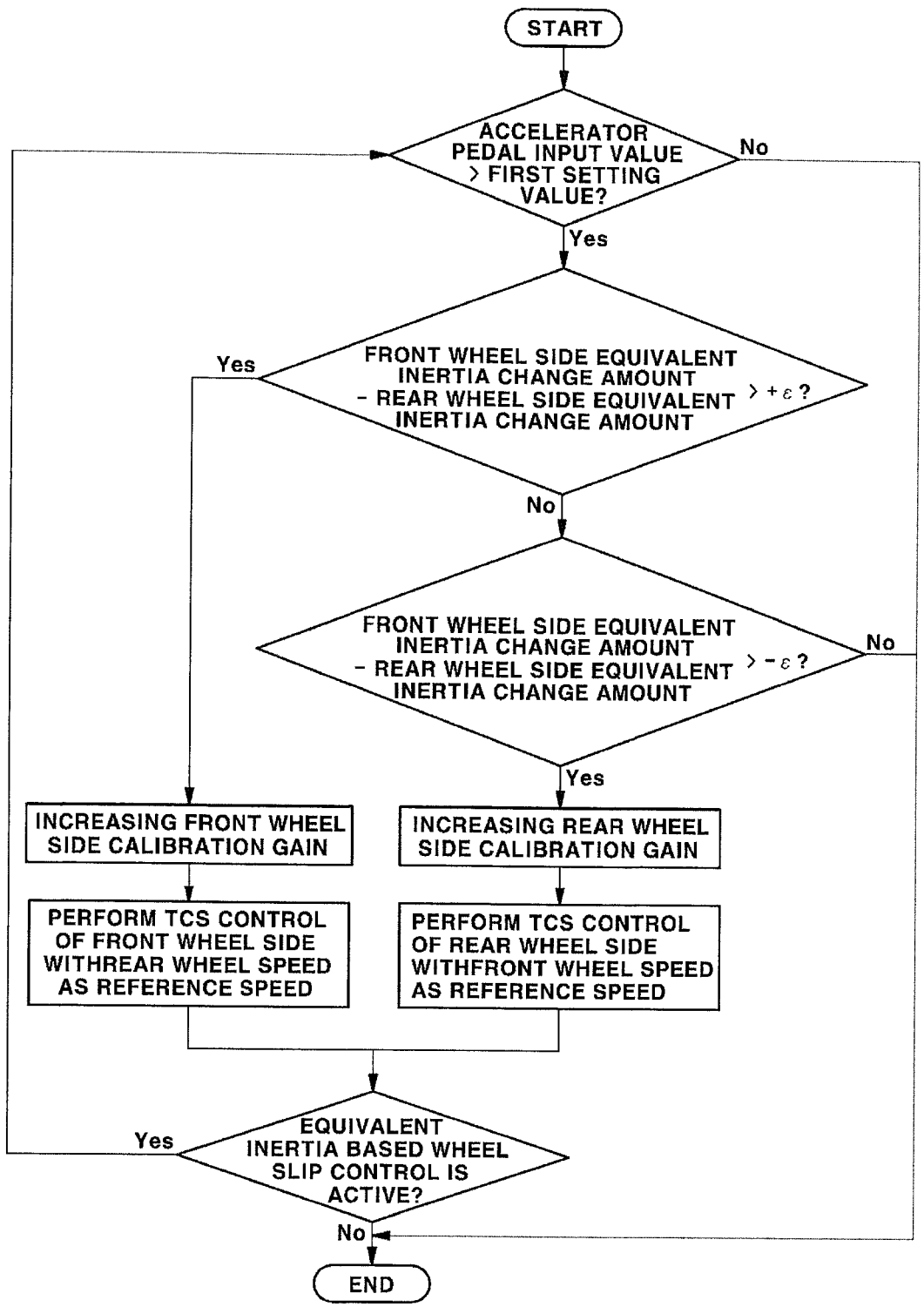

[FIG. 4]
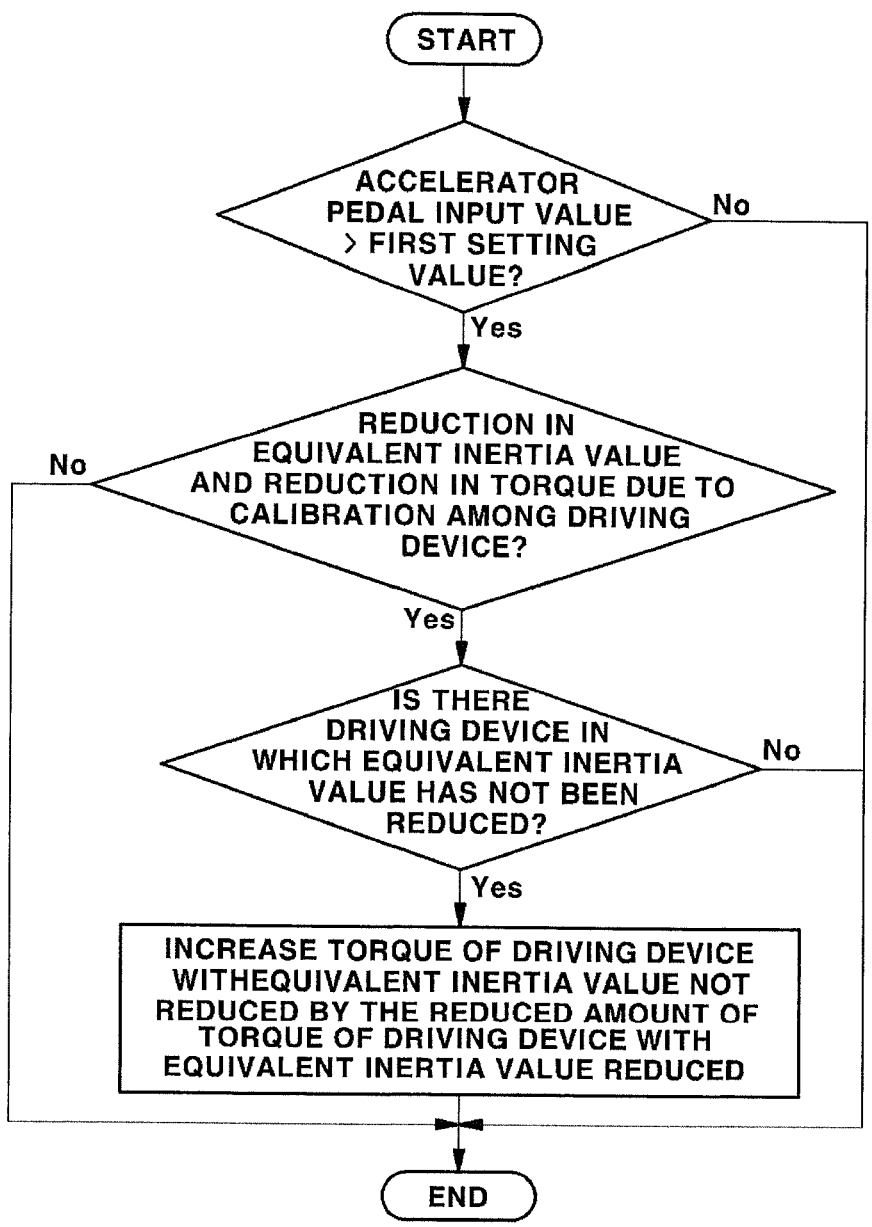

[FIG. 5]
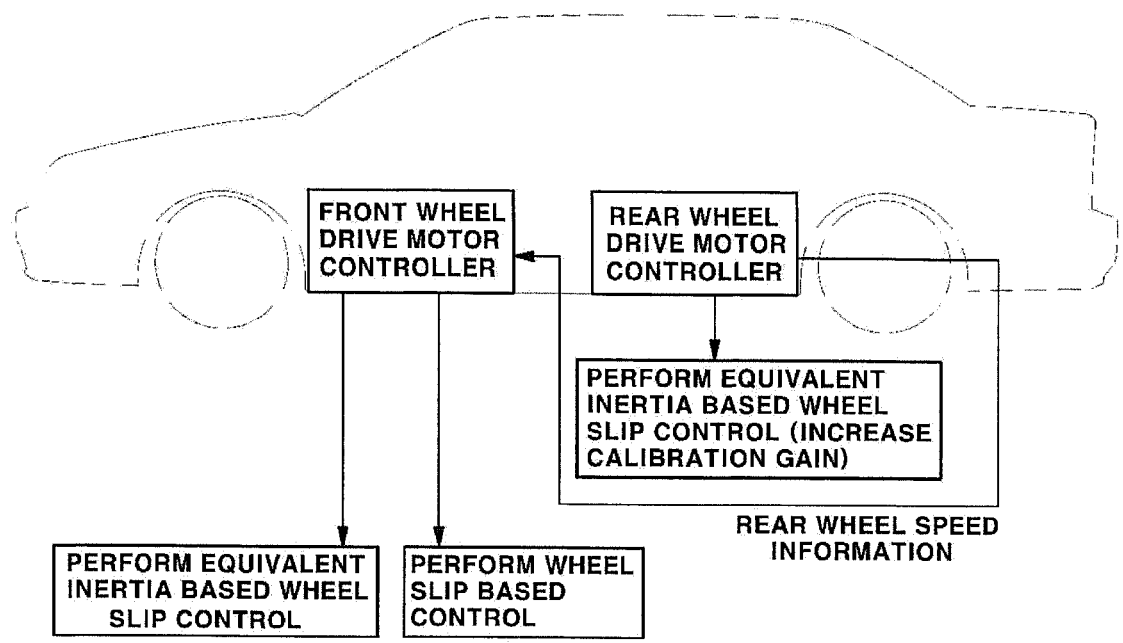
[FIG. 6]
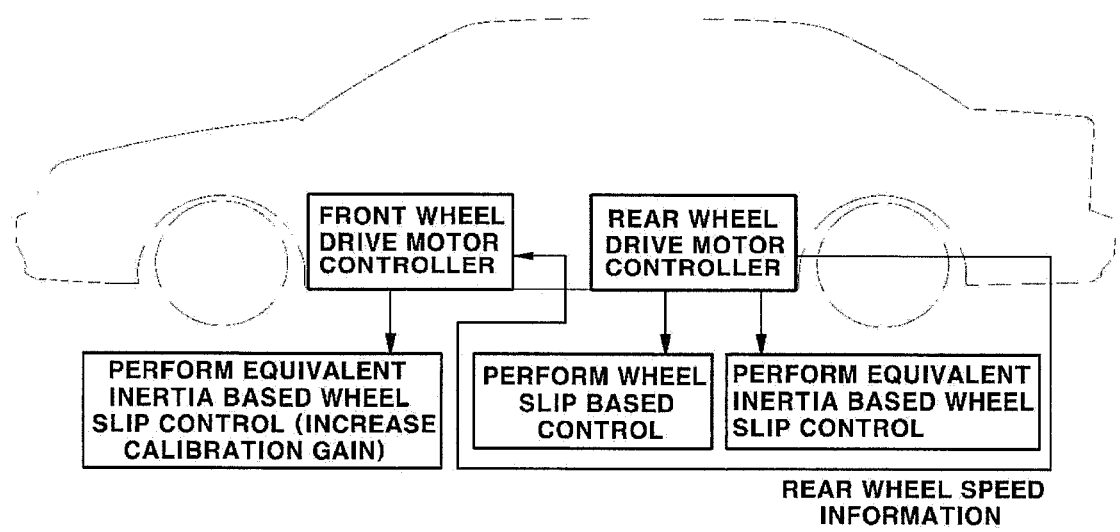

[FIG. 7]
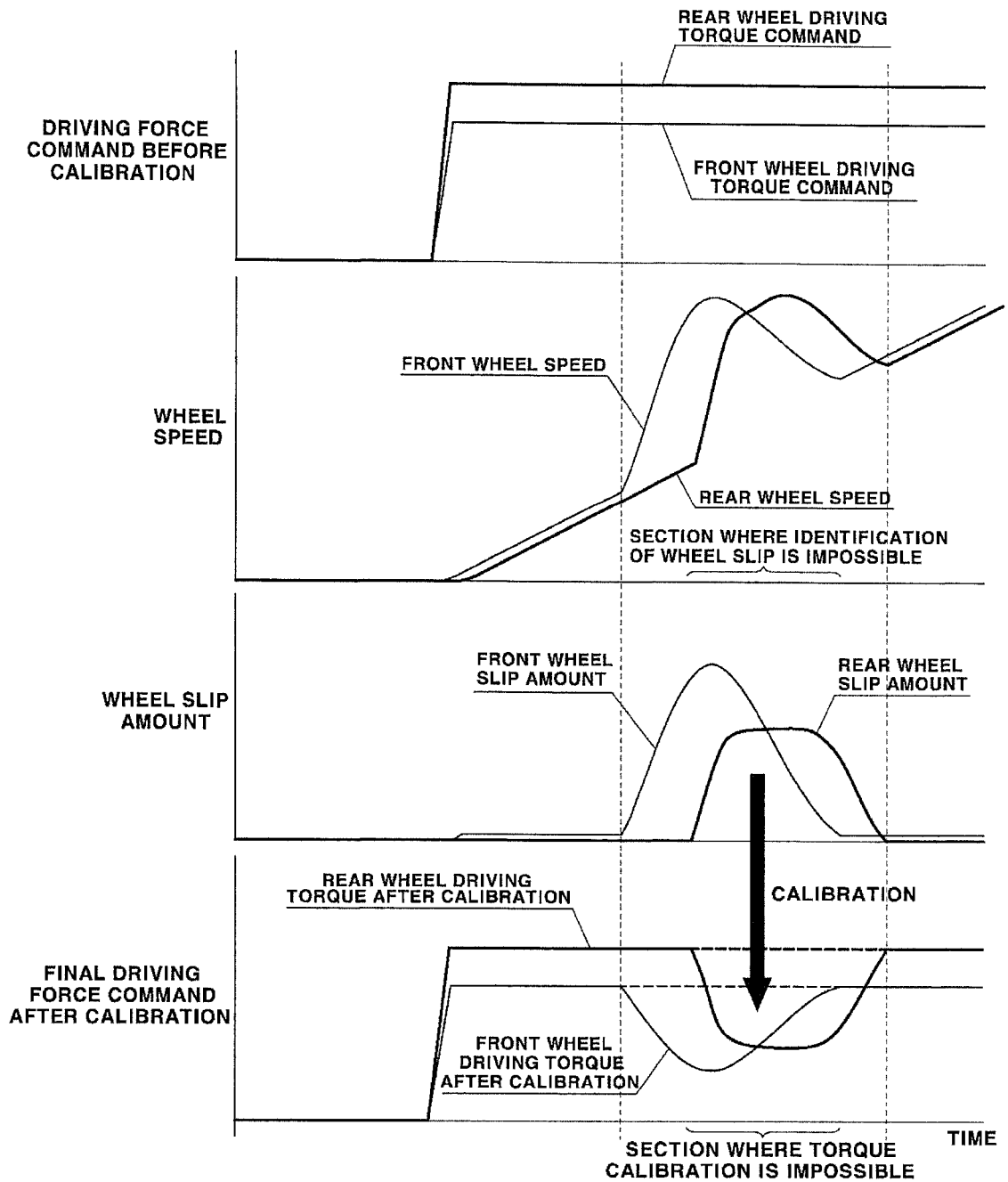

[FIG. 8]
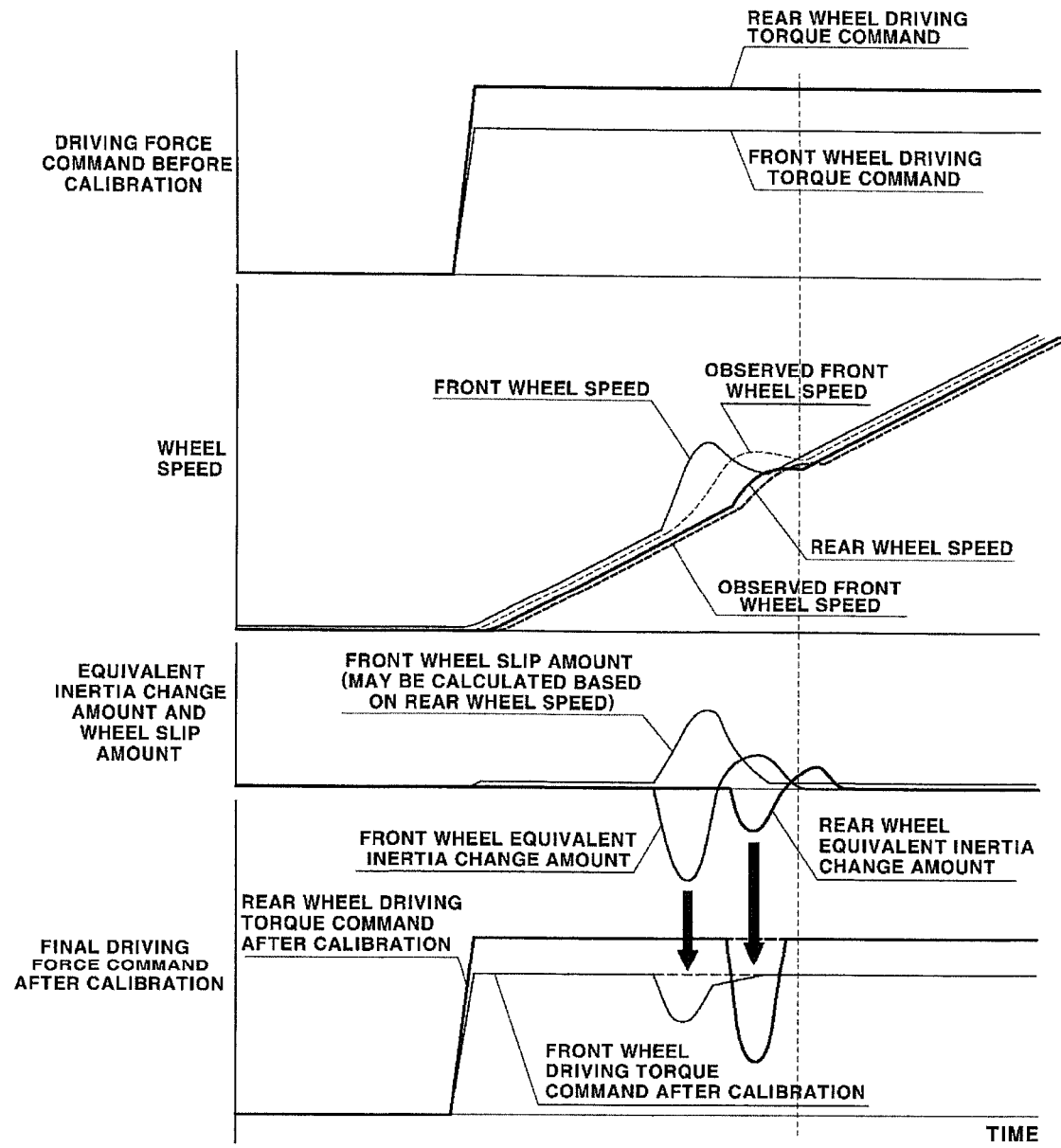

METHOD FOR CONTROLLING WHEEL SLIP OF VEHICLE

CROSS-REFERENCE TO RELATED APPLICATION

This application claims the benefit of priority to Korean Patent Application No. 10-2019-0096433 filed on Aug. 8, 2019, the entire contents of which are incorporated herein by reference.

TECHNICAL FIELD

The present disclosure relates to a method for controlling wheel slip of a vehicle, and more particularly, to a method for controlling wheel slip, which may individually control wheel slip of each vehicle wheel without using a reference speed or a complicated dynamics model in a vehicle having a plurality of driving devices.

BACKGROUND

In general, as an electronic control system for improving safety during traveling of a vehicle, an Anti-lock Brake System (ABS) for preventing brake lock due to wheel slip on a slippery road surface at braking of the vehicle, a Traction Control System (TCS) for controlling a driving force or a braking force at sudden start or sudden acceleration of the vehicle to prevent the wheel slip, an Electronic Stability Program (ESP) for stably controlling the posture of the vehicle, etc. have been used.

Among them, the TCS is an active safety device for preventing excessive slippage of a drive wheel at starting or acceleration of the vehicle on a low friction road or an asymmetric road, preventing vehicle spin, and improving the starting and acceleration performance of the vehicle and the steering stability.

When an excessive driving force is generated at the starting or acceleration of the vehicle on a slippery road surface and thus the phenomenon of wheel slip, etc. is generated, the TCS controls the speed of the drive wheel by controlling the driving force (driving torque) or the braking force (braking torque) of the vehicle, and as a result, the acceleration of the vehicle may be maximized.

Here, the driving force of the vehicle may mean a torque output from a vehicle driving source, and the vehicle driving source may be a motor (pure electric vehicle, fuel cell vehicle), an engine (internal combustion engine vehicle), or a motor and an engine (hybrid vehicle).

For example, a motor-driven vehicle such as a pure electric vehicle, a fuel cell vehicle, or a hybrid vehicle determines a target drive wheel speed through which an optimum driving force from the drive wheel can be obtained according to the amount of slip generated between the drive wheel and the road surface, the friction coefficient of the road surface, etc., and the motor torque is controlled so as to follow the above target speed.

In addition, it is possible to reduce the motor torque in order to prevent instability of the vehicle when the vehicle turns at a corner road, thereby allowing the vehicle to turn safely.

At operation of the TCS, torque is adjusted so as to reduce slip by calculating the slip of the vehicle wheel based on the actual vehicle speed during traveling, and it is necessary to know the actual vehicle speed and the vehicle wheel speed, which are real-time information, in order to calculate the slip of the vehicle wheel.

For example, the slip rate ($\lambda$) of the vehicle wheel may be calculated as follows.

$$\lambda(\%) = (Vveh - Vwhl)/Vveh \times 100,$$

where, 'Vveh' refers to a vehicle speed, that is, the vehicle body speed, which is a reference speed necessary for calculating the slip rate, and this reference speed has the meaning of the vehicle speed in a state where there is no slip, and is essential information for the TCS operation, and 'Vwhl' refers to a vehicle wheel speed (wheel speed), which is measured by a wheel speed sensor.

As described above, since the reference speed is essential for the TCS operation, accurate estimation of the reference speed is required to implement accurate and proper control performance.

In general, the reference speed may be obtained by using the vehicle wheel speed of the non-driven wheel, by using a G sensor for detecting the longitudinal acceleration, or the vehicle speed obtained through GPS reception information may be used as the reference speed, and furthermore, a yaw rate sensor is also used to calibrate the reference speed.

Despite the introduction of various electronic control systems in the vehicle, the behavior of the vehicle is finally limited due to the limitation of the road frictional force.

This is because the behavior of the vehicle depends on the frictional force between the road surface and the tire, and accordingly, how to effectively use the frictional force becomes an important factor in determining the behavior of the vehicle.

The maximum road frictional force is influenced by a combination of factors such as the characteristics of the road surface, a longitudinal/lateral tire slip, a tire vertical load, etc., and typically, as the magnitude of the slip increases, the available frictional force reduces.

Accordingly, it is important to maintain effective longitudinal/lateral frictional force by limiting the tire slip of the vehicle wheel, and this role is played by the electronic control system such as ABS or TCS in the vehicle.

However, in the known ABS or TCS control method, it is difficult to maintain the ideal control performance due to a control period delay or a wheel speed signal processing for preventing malfunction, such that the slip condition that produces the maximum road frictional force is not maintained and thus a significant slip occurs.

As a result, due to the characteristics of the tire that the tire frictional force becomes lower than the maximum road surface frictional force in the situation where the tire slip rate of the vehicle wheel is high, a low frictional force rather than a higher one is used, thereby not effectively securing stability and performance of the vehicle.

In addition, the known ABS and TCS control methods have a high dependency on the actual vehicle speed, which is a reference speed, such that it is difficult to secure effective control performance when slip is present on all vehicle wheels, and in particular, there are many difficulties in controlling slip through adjusting a driving force or a braking force in a Four Wheel Drive (4WD) vehicle.

The above information disclosed in this Background section is only for enhancement of understanding of the background of the disclosure and accordingly it may contain information that does not form the prior art that is already known in this country to a person of ordinary skill in the art.

SUMMARY OF THE DISCLOSURE

The present disclosure is intended to solve the above problem, and an object of the present disclosure is to provide a method for controlling wheel slip, which may perform individual wheel slip control of each vehicle wheel without using a reference speed or a complicated dynamics model in a vehicle having a plurality of driving devices, and may be applied to a plurality of driving devices.

According to an aspect of the present disclosure, a method for controlling wheel slip of a vehicle, which includes a plurality of driving devices for generating driving force for driving the vehicle, includes: obtaining, by a controller, equivalent inertia information for each driving device in real time, based on operation information of each driving device during traveling of the vehicle; calculating, by the controller, a calibration amount for calibrating a driving force command or a braking force command for each drive wheel from the equivalent inertia information for each driving device obtained in real time; calibrating, by the controller, the driving force command or the braking force command for each drive wheel by using the calculated calibration amount; and controlling, by the controller, the driving force according to the calibrated driving force command or controlling the braking force according to the calibrated braking force command.

The controller, when an accelerator pedal input value is larger than a first setting value, calculates the calibration amount for calibrating the driving force command of each drive wheel side, and calibrates the driving force command of each drive wheel side by using the calculated calibration amount.

The method further includes recognizing, by the controller, a control mode selected by a driver from a performance priority mode and a stability priority mode, which have been set, and the vehicle is a front and rear wheel drive vehicle having a front wheel driving device and a rear wheel driving device, and at acceleration in which the accelerator pedal input value is larger than the first setting value and the performance priority mode has been selected, the calibration amount for calibrating a front wheel side driving force command is calculated to be a value larger than the calibration amount for calibrating a rear wheel side driving force command in the controller.

At an acceleration in which the accelerator pedal input value is larger than the first setting value and the performance priority mode has been selected, the controller determines a front wheel side calibration gain for determining the calibration amount of the front wheel side driving force command to be a value larger than a rear wheel side calibration gain for determining the calibration amount of the rear wheel side driving force command.

The controller increases the difference between the front wheel side calibration gain and the rear wheel side calibration gain as the driving force command increases.

In a state where a control of the driving force applied to each drive wheel side has been performed according to the calibrated driving force command, the controller performs a rear wheel slip control at a reference vehicle speed determined by using a front wheel speed or the lowest vehicle wheel speed.

At an acceleration in which the accelerator pedal input value is larger than the first setting value and the stability priority mode has been selected, the calibration amount for calibrating a front wheel side driving force command is calculated to be a value smaller than the calibration amount for calibrating a rear wheel side driving force command in the controller.

At an acceleration in which the accelerator pedal input value is larger than the first setting value and the stability priority mode has been selected the controller determines a front wheel side calibration gain for determining the calibration amount of the front wheel side driving force command to be a value smaller than a rear wheel side calibration gain for determining the calibration amount of the rear wheel side driving force command.

The controller increases the difference between the front wheel side calibration gain and the rear wheel side calibration gain as the driving force command increases.

When the stability priority mode is selected, in a state where the control of the driving force applied to each drive wheel side has been performed according to the calibrated driving force command, the controller performs a front wheel slip control at a reference vehicle speed determined by using a rear wheel speed or the lowest vehicle wheel speed.

At braking in which a brake pedal input value is larger than a second setting value, the controller calculates the calibration amount for calibrating a braking force command of each drive wheel side from equivalent inertia information for each driving system obtained in real time, and calibrates the braking force command for each drive wheel side by using the calculated calibration amount.

At braking in which the brake pedal input value is larger than the second setting value, the calibration amount for calibrating a front wheel side braking force command is calculated to be a value smaller than the calibration amount for calibrating a rear wheel side braking force command in the controller.

At braking in which the brake pedal input value is larger than the second setting value, the controller determines a front wheel side calibration gain for determining the calibration amount of the front wheel side braking force command to be a value smaller than a rear wheel side calibration gain for determining the calibration amount of the rear wheel side braking force, command.

The controller increases the difference between the front wheel side calibration gain and the rear wheel side calibration gain as the braking force command increases.

In a state where the control of the braking force applied to each drive wheel side has been performed according to the calibrated braking force command, the controller performs a front wheel slip control at a reference vehicle speed determined by using a rear wheel speed or a lowest vehicle wheel speed.

The operation information of each driving system is a torque command of a previous control period for the driving device of each drive wheel side and speed information of each drive wheel side driving system.

The speed of the driving system is one of the speeds: a speed of the drive wheel, a speed of the driving device, a rotational speed of a transmission input shaft, and a rotational speed of a transmission output shaft.

The equivalent inertia information for each driving system for calculating the calibration amount is a real-time equivalent inertia change amount of the driving system.

In performing the control of the driving force or the braking force, the controller applies the sum of the driving force or the braking force corresponding to the calibration amount of the driving force command or the calibration amount of the braking force command to the other vehicle wheel side.

In the controller, the sum of the driving force or braking force is determined based on the real-time equivalent inertia change amount of the other vehicle wheel side.

According to the method for controlling the wheel slip of the vehicle according to the present disclosure, it is possible to perform the individual wheel slip control for each drive wheel in the vehicle having a plurality of driving devices, thereby improving the behavior stability of the vehicle.

In addition, according to the method for controlling the wheel slip of the present disclosure, it is possible to perform the wheel slip control based on the equivalent inertia without a reference speed that requires the complicated calculation process and calibration process, thereby applying the slip control individually to each driving device or drive wheel.

Further, it is possible to diversify the vehicle behavior according to the driver's propensity and the setting value, and this may be implemented through the strategy for varying the torque calibration gain based on the equivalent inertia in real time.

Moreover, it is possible to reduce the slip of the vehicle wheel in advance before the function of an Electronic Stability Program (ESP) previously applied to the vehicle, thereby securing the driving performance.

It is understood that the term "vehicle" or "vehicular" or other similar terms as used herein are inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given herein below by way of illustration only, and thus are not limitative of the present disclosure, and wherein:

FIG. 1 is a block diagram schematically showing a configuration of a system for performing a wheel slip control according to an exemplary embodiment of the present disclosure.

FIGS. 2 to 4 are flowcharts showing a wheel slip control process according to an exemplary embodiment of the present disclosure.

FIGS. 5 and 6 are diagrams showing the wheel slip control method applied for each vehicle wheel according to a control mode selected by a driver according to an exemplary embodiment of the present disclosure.

FIGS. 7 and 8 are diagrams showing control states of a Comparative Example, and an exemplary embodiment, respectively.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, exemplary embodiments of the present disclosure will be described in detail with reference to the accompanying drawings so that those skilled in the art may easily carry out the present disclosure. However, the present disclosure is not limited to the embodiments described herein and may also be embodied in other forms.

Throughout the specification, when a part is described as "comprising" some elements, it means that the part may include other elements as well rather than excluding them unless specifically stated otherwise.

The present disclosure relates to a method for controlling wheel slip of a vehicle, and an object of the present disclosure is to provide a method capable of effectively controlling wheel slip of a vehicle without using a vehicle wheel speed of a non-driven wheel or using a reference speed obtained by using a complicated calculation with other methods.

In addition, the present disclosure also relates to a method for controlling wheel slip of a vehicle that may effectively limit wheel slip of a vehicle wheel in a transient section.

Here, the transient section means a section of a pre-operation state of a Traction Control System (TCS) where TCS operation is expected before satisfying the known TCS operating condition, more specifically, a transitional section from a normal traveling state to a state where TCS operation is required.

In addition, the present disclosure relates to a method for controlling the wheel slip useful for a motor-driven vehicle such as an eco-friendly vehicle, that is, a Battery Electric Vehicle (BEV), a hybrid vehicle (Hybrid Electric Vehicle, HEV), a fuel cell vehicle (Fuel Cell Electric Vehicle, FCEV), using a motor as a vehicle driving source, that is, a driving device for driving a vehicle.

That is, since the method for controlling the wheel slip according to an exemplary embodiment of the present disclosure performs a driving force control for the driving device in real time, immediately and instantaneously based on the equivalent inertia for suppressing or limiting the wheel slip as described later, it is useful for the vehicle mounted with the motor having a fast control responsiveness compared to the engine as the driving device of the vehicle.

In addition, the present disclosure may be applied to a vehicle having a plurality of driving devices rather than the vehicle having one driving device, for example, an all-wheel drive (four-wheel drive) vehicle having a front wheel drive motor and a rear wheel drive motor, or an in-wheel motor vehicle having a motor in each vehicle wheel.

In addition, the known TCS calculates the slip amount (or slip rate) of the drive wheel corresponding to the difference between the two speeds by using the reference speed and the wheel speed (drive wheel speed), and adjusts the torque (may be a driving torque or a braking torque) so as to reduce the slip amount.

On the other hand, the present disclosure determines the equivalent inertia for each driving system based on the operation information of each driving system, and adjusts the torque so as to increase the equivalent inertia.

Here, the operation information of each driving system includes the driving force command of the previous control period for the driving device of each drive wheel side (for example, front wheel side and rear wheel side) and the speed information of each driving system (for example, front wheel side driving system, rear wheel side driving system).

As described above, the present disclosure controls the wheel slip by adjusting the driving force based on the equivalent inertia without using the actual vehicle speed, which is a reference speed, and this method may secure fast responsiveness in the transient section, but the actual vehicle speed information may be insufficient, such that this may make it difficult to perform an effective slip limit control under the TCS operating condition.

Accordingly, the present disclosure provides not only a control process for limiting the wheel slip of the front wheel and the rear wheel, which is performed based on the equivalent inertia of the vehicle in a vehicle having a plurality of driving devices, for example, a front and rear wheel driving vehicle having a front wheel drive motor and a rear wheel drive motor, but also a process of performing an effective slip limit control under the TCS operating condition by obtaining and then using an actual vehicle speed information from the speed of the vehicle wheel at which slip is suppressed through the individual wheel slip control based on the equivalent inertia.

Hereinafter, exemplary embodiments of the present disclosure will be described in more detail with reference to the drawings.

FIG. 1 is a block diagram schematically showing a configuration of a system for performing a wheel slip control according to an exemplary embodiment of the present disclosure, and exemplifies a configuration of a system for performing a wheel slip control in a front and rear wheel drive vehicle equipped with a front wheel drive motor 31 and a rear wheel drive motor 32.

As shown in FIG. 1, a system for performing wheel slip control according to an exemplary embodiment of the present disclosure includes a speed detector 11 for detecting a speed of a driving system, a controller 20 for generating a calibrated torque command for a wheel slip control by receiving speed information of the driving system detected by the speed detector 11, and a plurality of driving devices for operating according to the calibrated torque command generated and output by the controller 20.

Here, the plurality of driving devices may be a front wheel drive motor 31 and a rear wheel drive motor 32 in FIG. 1, and unlike FIG. 1, an in-wheel motor installed in each wheel in the case of an in-wheel motor vehicle.

In addition, according to an exemplary embodiment of the present disclosure, the system for performing the wheel slip control may further include an operation information detector 12 for detecting driving input information of a driver, and a mode selector 13 for the driver to use for selection of a control mode.

Here, the driver's driving input information may include an accelerator pedal operation state and a brake pedal operation state of the driver, and the operation information detector 12 may include an Accelerator Pedal Sensor (APS) for outputting a signal according to the accelerator pedal operation of the driver, and a Brake Pedal Sensor (BPS) for outputting a signal according to the brake pedal operation of the driver.

In the system, the speed detector 11, the operation information detector 12, and the mode selector 13 are connected to the controller 20 to enable signal input.

For example, the controller 20 receives a signal of the speed detector 11 to obtain the speed information of the driving system, and also receives a signal of the operation information detector 12 to obtain information on the accelerator pedal and brake pedal operation state of the driver, that is, information on an accelerator pedal input value and an brake pedal input value.

In addition, the controller 20 receives a signal of the mode selector 13 to recognize a control mode selected by the driver.

The torque control for limiting the wheel slip based on equivalent inertia is performed by the in-vehicle controller 20, and the in-vehicle controller 20 may be a controller for performing a known TCS control or a wheel slip control, and this controller may mean a single controller or a plurality of controllers for performing a cooperative control.

The controller 20 may be one integrated controller used regardless of the driving device, or may be a plurality of controllers provided for each driving device. The controller 20 may include a processor, a computer, an Electronic Control Unit (ECU), etc.

In addition, the controller 20 may be a controller of the concept including both a vehicle controller, which is an upper controller, and a motor controller, which is a lower controller, which performs a cooperative control in the vehicle.

In the present disclosure, the controller 20 generates a primary driving force command required for traveling the vehicle in a general method according to the driver's operating input or cruise mode input.

Here, the driving force command may be a torque command (for example, a driving torque command) of the driving device, and specifically, may be a motor torque command in the motor-driven vehicle.

In addition, the controller 20 determines, as the operation information of the driving system of each drive wheel side, an equivalent inertia of the corresponding driving system from the driving force (torque) command of the previous control period for each driving device and the speed information of the corresponding driving system, and calculates a driving force calibration amount, that is, a torque calibration amount for an individual wheel slip limit control based on the determined equivalent inertia information.

Subsequently, the controller 20 calibrates the primary driving force command by using the calculated driving force calibration amount, and controls the operation of the driving device with the calibrated driving force command.

The equivalent inertia may be obtained from the relationship of 'Tq=I×α', where the 'Tq' refers to a torque, the 'I' refers to an equivalent inertia, and the 'α' refers to an angular acceleration, such that for a simple example, a required equivalent inertia may be calculated from the angular acceleration obtained from the speed of the driving system and the torque information transferred through the corresponding driving system.

Here, the torque command may be a torque command of the previous control period, which is a final torque command, that is, a driving force (torque) command of the previous control period for the driving device, and when the driving force (torque) has been calibrated based on the previous equivalent inertia information in the previous control period, it may be the calibrated driving force command of the previous control period.

In addition, in calculating the driving force calibration amount for calibration based on the equivalent inertia information, specifically, the driving force calibration amount may be calculated by using the real-time change amount of the equivalent inertia and a calibration gain.

That is, the driving force calibration amount may be determined as a value obtained by applying the calibration gain to the equivalent inertia change amount, and for example, may be obtained by multiplying the equivalent inertia change amount by the calibration gain, and at this time, the larger the equivalent inertia calibration amount is, the larger the driving force calibration amount is.

In addition, in the present disclosure, once the driving force calibration amount, which is defined as a positive value, has been obtained, the driving force calibration amount may be generated by subtracting the driving force calibration amount from the driving force command.

In the present disclosure, calibrating the driving force means reducing the driving force (torque) generated by the driving device and applying it to the corresponding drive wheel compared to that before calibration, and the upward gain calibration means further reducing the driving force applied to the corresponding drive wheel.

As a result, as described above, when the calibrated driving force command is generated, the vehicle driving force control for controlling the driving device is performed by targeting the above.

The speed of the driving system for obtaining the equivalent inertia may be a speed (wheel speed) of the drive wheel connected with the driving device, or may be a rotational speed of the driving device, that is, a motor speed, or a rotational speed of a transmission input shaft or a rotational speed of a transmission output shaft.

As described above, the speed of the driving system may be a rotational speed of a driving element existing in a route through which a driving force is transferred from a driving device for driving a vehicle to a drive wheel, or may mean a rotational speed related to other drive wheel speeds, which is a measured value and may be real-time rotational speed information of the driving system detected by the speed detector 11 shown in FIG. 1.

In the present disclosure, when the speed of the driving system is the speed of the drive wheel, the speed detector 11 may be a wheel speed sensor installed in the corresponding drive wheel.

Alternatively, in the present disclosure, when the speed of the driving system is a motor speed, the speed detector 11 may be a known resolver installed in each motor.

In the present disclosure, when the vehicle is a front and rear wheel drive (four-wheel drive) vehicle having both the front wheel drive motor 31 and the rear wheel drive motor 32, the speed of the driving system may be classified into the speed of a front wheel side driving system or the speed of a rear wheel side driving system.

At this time, the speed detector 11 may be a wheel speed sensor installed at the front wheel and the rear wheel, respectively, or may be a resolver installed at the front wheel drive motor 31 and the rear wheel drive motor 32, respectively.

Alternatively, the speed of the driving system may be an observed speed of the driving system by an observer rather than the measured value, or the measured speed of the driving system and the observed speed of the driving system may be used together as a speed of the driving system for calculating equivalent inertia information.

In the present disclosure, since the vehicle has a plurality of driving devices, the equivalent inertia and the amount of change thereof, and the torque calibration and the wheel slip limit control based on the equivalent inertia may be implemented for each driving device and drive wheel.

In the following description, a front and rear wheel drive (four-wheel drive) vehicle having the front wheel drive motor 31 and the rear wheel drive motor 32 will be described, for example.

In an exemplary embodiment of the present disclosure, a driving force control for the front wheel drive motor 31 is performed in order to limit a wheel slip of the front wheel, and a driving force control for the rear wheel drive motor 32 is performed for limiting a wheel slip of the rear wheel.

In this case, in the driving force control process for limiting the wheel slip of the front wheel, the real-time equivalent inertia information for the equivalent inertial of the vehicle may be obtained based on the final torque command, that is, the torque command of the previous control period of the front wheel drive motor 31 and the speed information of the driving system of the front wheel side, and the driving calibration amount of the front wheel side may be calculated by applying the calibration gain to the real-time change amount of the equivalent inertia.

As a result, the torque command that is the driving force command may be calibrated by using the driving force calibration amount calculated as described above, that is, the torque calibration amount.

In the driving force control process for limiting the wheel slip of the front wheel, the torque and the torque command, the torque command of the previous control period, the calibrated torque command, the driving force and the driving force command, the calibration gain, the torque (driving force) calibration amount, the equivalent inertia and the equivalent inertia change amount are related to the front wheel elements such as driving of the front wheel and the wheel slip control of the front wheel.

Likewise, in the driving force control process for limiting the wheel slip of the rear wheel, real-time equivalent inertia information for the equivalent inertia of the vehicle may be obtained based on the final torque command, that is, the torque command of the previous control period of the rear wheel drive motor 32 and the speed information of the driving system of the rear wheel side, and the driving force calibration amount of the rear wheel side may be calculated by applying the real-time change amount of the equivalent inertia to the calibration gain.

As a result, the torque command that is the driving force command may be calibrated by using the driving force calibration amount calculated as described above, that is, the torque calibration amount.

In the driving force control process for limiting the wheel slip of the rear wheel, the torque and the torque command, the torque command of the previous control period, the calibrated torque command, the driving force and the driving force command, the calibration gain, the torque (driving force) calibration amount, the equivalent inertia and the equivalent inertia change amount are all related to the rear wheel elements such as driving of the rear wheel and the wheel slip control of the rear wheel.

In exemplary embodiments of the present disclosure, for example, when a certain torque command is applied to the front wheel drive motor 31, and a certain torque command is applied to the rear wheel drive motor 32, the equivalent inertia change amount of each driving system will be maintained constantly without change if the wheel slip is not generated at the front wheel and the rear wheel.

However, when the wheel slip is generated in the front wheel and the rear wheel, a change in the equivalent inertia will occur in the front wheel side driving system and the rear wheel side driving system, and when the change in the equivalent inertia occurs in real time, the real-time change amount of the equivalent inertia may be calculated by using, as a reference value, the equivalent inertia value which has been maintained while the wheel slip not occurring.

In the above manner, the equivalent inertia change amount relative to the reference value in the front wheel side driving system and the rear wheel side driving system, that is, the front wheel side equivalent inertia change amount and the rear wheel side equivalent inertia change amount may be calculated, respectively.

In the following description, as related to the front wheel, the calibration gain is referred to as 'first calibration gain,' the torque (or driving force) calibration amount is referred to as 'first torque calibration amount' (or 'first driving force calibration amount'), the equivalent inertia is referred to as 'first equivalent inertia,' and the equivalent inertia change amount is referred to as 'first equivalent inertia change amount.'

In addition, as related to the rear wheel, the calibration gain is referred to as 'second calibration gain,' the torque (or driving force) calibration amount is referred to as 'second torque calibration amount' (or 'second driving force calibration amount'), and the equivalent inertia is referred to as 'second equivalent inertia,' and the equivalent inertia change amount is referred to as 'second equivalent inertia change.'

In addition, in the following description, a 'front wheel driving device' and a 'first driving device,' a 'front wheel drive motor', and 'first drive motor' may be used interchangeably and described as having the same meaning, and a 'rear wheel driving device,' 'second driving devise,' 'rear wheel drive motor,' and 'second drive motor' may be used interchangeably and described as having the same meaning.

In exemplary embodiments of the present disclosure, the calibration gain may be changed in real time based on the control mode selected by the driver and the current equivalent inertia information.

Here, the control mode may include a performance priority mode and a stability priority mode, and the equivalent inertia information may include a drive wheel side equivalent inertia change amount.

In exemplary embodiments of the present disclosure, the driver may select one of a plurality of control modes, that is, the performance priority mode and the stability priority mode, and for this purpose, the vehicle has a mode selector 13 used to select a desired control mode provided therein.

That is, the driver may select a desired mode from the performance priority mode and the stability priority mode through the mode selector 13, and the performance priority mode and the stability priority mode are different control modes performed at operation of the vehicle, in particular, at acceleration of the vehicle, and two control modes are different such that a variable driving force control for limiting the wheel slip may be performed.

In exemplary embodiments of the present disclosure, in order to implement the performance priority mode and the stability priority mode, the controller 20 has a control logic for performing a control process for each mode set therein, and in a state where the control logic of the control mode has been set, when the driver selects one desired mode from two control modes through the mode selector 13, the controller 20 receives the signal of the mode selector 13 to recognize the mode selected by the driver and then performs the control process of the selected mode.

In exemplary embodiments of the present disclosure, the calibration gain is used to determine the control calibration amount, that is, the torque (driving force) calibration amount for each driving device to which the drive wheel of the vehicle is connected, and the calibration gain may be determined in different methods depending on whether the vehicle is at operation or braking, and at operation, the calibration gain may be determined with different methods according to the control mode.

Accordingly, the wheel slip control is performed differently depending on whether being at operation or braking, and at operation, the wheel slip control is performed depending on the control mode selected by the driver.

Hereinafter, explaining the control method in more detail with reference to the drawings, FIGS. 2 to 4 are flowcharts showing a wheel slip control process according to an exemplary embodiment the present disclosure, and FIGS. 5 and 6 are diagrams showing the wheel slip control method applied to each vehicle wheel according to the control mode selected by the driver in the present disclosure.

In addition, FIGS. 7 and 8 are diagrams showing control states of a Comparative Example and an exemplary embodiment, respectively.

First, as shown in FIG. 2, when the driver selects a desired control mode through the mode selector 13, the controller 20 recognizes a control mode selected by the driver from a mode selection signal input from the mode selector 13.

Subsequently, the controller 20 determines, during traveling of the vehicle, whether it is at operation in which the driver has pressed an accelerator pedal or at braking in which the driver has pressed a brake pedal from the driver's operation input information detected by the operation information detector 12.

At this time, the controller 20 compares a driver accelerator pedal input value detected by an accelerator pedal sensor of the operation information detector 12 with a first predetermined setting value, and at operation when the accelerator pedal input value is larger than the first setting value, that is, in an acceleration state where the driver has operated the accelerator pedal at a certain level or more, the controller 20 performs the wheel slip control for the drive wheel in the control mode selected by the driver.

The wheel slip control according to an exemplary embodiment of the present disclosure is performed for the drive wheel connected with the driving device in the vehicle; for example, in the case of the front and rear wheel driving vehicle (which is a four-wheel drive vehicle) equipped with the front wheel drive motor (first drive motor) 31 and the rear wheel drive motor (second drive motor) 32, the individual wheel slip limit control is performed for the front wheel connected with the front wheel drive motor 31 and the rear wheel connected with the rear wheel drive motor 32, respectively.

The individual wheel slip limit control process is performed by the controller 20, and in the individual wheel slip limit control process performed by the controller 20, a driving force (torque) command for the front wheel drive motor (first drive motor) 31 and a driving force (torque) command for the rear wheel drive motor (second drive motor) 32 are obtained based on the driver's operation input information, for example, the accelerator pedal input value.

In addition, the first equivalent inertia change amount of the front wheel side and the second equivalent inertia change amount of the rear wheel side, which are the real-time change amount information of the equivalent inertia, are determined.

Here, the first equivalent inertia change amount is the real-time change amount information of the equivalent inertia obtained from the first equivalent inertia of the front wheel side, and the second equivalent inertia change amount is the real-time change amount information of the equivalent inertia calculated from the second equivalent inertia of the rear wheel side.

In addition, the first equivalent inertia may be obtained based on the final driving force command for the front wheel drive motor 31, that is, the driving force (torque) command of the previous control period and the front wheel side driving system speed, and the second equivalent inertia may be obtained based on the final driving force command for the rear wheel drive motor 32, that is, the driving force (torque) command of the previous control period and the rear wheel side driving system speed.

The driving force (torque) command of the previous control period may be a calibrated driving force command in the case that the calibration for the wheel slip control has been performed in the previous control period.

Subsequently, as described above, after the first equivalent inertia change amount of the front wheel side and the second equivalent inertia change amount of the rear wheel side are determined, a first driving force calibration amount, which is a front wheel side calibration amount, and a second driving force calibration amount, which is a rear wheel side calibration amount, are calculated by applying a first calibration gain of the front wheel side and a second calibration gain of the rear wheel side obtained in real time to the first equivalent inertia change amount and the second equivalent inertia change amount, respectively.

Subsequently, the controller 20 calibrates the driving force command for the front wheel drive motor (first drive motor) 31 and the driving force command for the rear wheel drive motor (second drive motor) 32 obtained based on the driver's operation input information by using the calculated first and second driving force calibration amount, and controls the operation of the front wheel drive motor 31 and the rear wheel drive motor 32 by generating and outputting the calibrated driving force command.

As a result, it is possible to control the driving force applied to each drive wheel side according to the calibrated driving force command.

The above-described control process has described a basic process, and in an embodiment of the present disclosure, the calibration gain for calculating the calibration amount may be changed according to the mode selected by the driver, and the calibration gain may also be changed in real time according to the equivalent inertia information of each drive wheel side.

When the vehicle is driven, that is, when the vehicle is accelerated, load is transferred to the rear wheel side.

In a vehicle in which the four wheels of the front wheel and the rear wheel may generate a driving force, the weight distribution ratio of the front wheel and the rear wheel is almost 5:5.

At this time, when the load is transferred to the rear wheel side due to the acceleration of the vehicle, and thus the rear wheel side additionally obtains a vertical drag, the maximum acceleration force may be obtained while the driving force of the rear wheel is maximized.

Considering the above, in an exemplary embodiment of the present disclosure, when the performance priority mode is selected by the driver, the slip control of the front wheel is performed conservatively through the conservative torque calibration in order to maximize the driving force of the rear wheel in the performance priority mode.

Here, the conservative torque calibration may be defined as a control that sufficiently performs the torque calibration so that the slip is not generated even if the corresponding wheel (drive wheel) does not secure the maximum traction.

In addition, in the performance priority mode, it is assumed that the front wheel speed is the speed of the vehicle wheel that is less likely to cause the slip, and based on this, the rear wheel slip control is performed in the state where the calibration has been performed.

That is, the first calibration gain, which is the torque calibration gain based on the equivalent inertia of the front wheel side, is set to be larger than the second calibration gain, which is the calibration gain of the rear wheel side (the front wheel side calibration amount is set to be larger than the rear wheel side calibration amount), and in the state where the calibration has been performed, the TCS control of the rear wheel side is performed at the reference vehicle speed determined by using the front wheel speed or the minimum wheel speed.

At this time, the first calibration gain of the front wheel side and the second calibration gain of the rear wheel side are changed in real time, and the difference therebetween may increase as the torque command increases, and this is because the acceleration force and the load transfer amount increase as the driving force increases.

The purpose of the stability priority mode is not to maximize the driving force of the rear wheel, but to suppress the oversteer phenomenon by minimizing the slip amount of the rear wheel, and accordingly, in the stability priority mode, the calibration gain should not be determined according to the above-described strategy of the performance priority mode.

Accordingly, when the stability priority mode is selected by the driver, the stability priority mode conservatively performs, in contrast to the performance priority mode, the slip control of the rear wheel in order to minimize the amount of slip of the rear wheel, and as the speed obtained at this time is considered as the speed of the rear wheel which is less likely to cause the slip, the front slip control is performed after the calibration based on the above.

That is, the first calibration gain, which is the torque calibration gain based on the equivalent inertia of the front wheel side, is set to be smaller than the second calibration gain, which is the calibration gain of the rear wheel side (the rear wheel side calibration amount is set to be larger than the front wheel calibration amount), and the TCS control of the front wheel side is performed at the reference vehicle speed determined by using the rear wheel speed or the lowest vehicle wheel speed in the state where the calibration has been performed.

As in the performance priority mode, even in the stability priority mode, the first calibration gain of the front wheel side and the second calibration gain of the rear wheel side are changed in real time, and the difference therebetween may increase as the torque command increases.

Referring to FIG. 2, when the performance priority mode is selected, it may be seen that the first calibration gain of the front wheel side and the second calibration gain of the rear wheel side are determined as the calibration gain values of the performance priority mode.

On the contrary, when the stability priority mode is selected, it may be seen that the first calibration gain of the front wheel side and the second calibration gain of the rear wheel side are determined as the calibration gain values of the stability priority mode.

Accordingly, in a transient section at operation in which a driver acceleration input has been made at a predetermined level or more, as shown in FIGS. 5 and 6, the wheel slip control based on the equivalent inertia for the front wheel side and the rear wheel side may be performed, respectively, by using each relevant calibration gain obtained, and subsequently, in a steady section, the slip based control of the front wheel may be performed based on the speed information of the rear wheel and vice versa.

Here, the slip based control means a TCS control performed on other vehicle wheels (drive wheels) at the reference speed determined by using the speed of the vehicle wheel (drive wheel) that is least likely to cause the slip or the lowest vehicle wheel speed.

Here, the reference speed may be a calibration of the speed of the vehicle wheel that is least likely to cause the slip or the lowest vehicle wheel speed.

FIG. 5 is a diagram showing a state where the front and rear wheel side controls have been performed at acceleration when the stability priority mode has been selected, and FIG. 6 is a diagram showing a state where the front and rear wheel side controls have been performed at acceleration when the performance priority mode has been selected.

FIGS. 5 and 6 show that controllers are provided each for the front wheel drive motor and the rear wheel drive motor and the two controllers perform a cooperative control in the control process of the present disclosure.

As shown, controllers for performing the individual wheel slip control for the front wheel side and the rear wheel side may be provided, one for each motor, but one integrated controller rather than one for each motor may also be provided to perform the individual wheel slip control of the present disclosure.

As described above, in the stability priority mode, the second calibration gain of the rear wheel side may be set to a value larger than that of the first calibration gain of the front wheel side, and as shown in FIG. 5, the front wheel side wheel slip based control, that is, the TCS control of the front wheel side using the rear wheel speed as the reference speed (actual vehicle speed) is performed separately from the individual wheel slip control based on the equivalent inertia of the front wheel side and the rear wheel side (see FIG. 2).

In addition, as described above, in the performance priority mode, the first calibration gain of the front wheel side may be set to a value larger than the second calibration gain of the rear wheel side, and as shown in FIG. 6, the rear wheel side wheel slip based control, that is, the TCS control of the rear wheel side using the front wheel speed as the reference speed (actual vehicle speed) is performed separately from the individual wheel slip control based on the equivalent inertia of the front wheel side and the rear wheel side (see FIG. 2).

At operation (acceleration) of the vehicle, the grip force is secured by reducing the magnitudes of the driving force and the driving torque generated by the driving device by the calibration amount through the calibration of the driving (torque) command to reduce the wheel slip, while at braking (deceleration) of the vehicle, the grip force is secured by reducing the magnitudes of the braking force and the braking torque generated by the braking device by the calibration amount through the calibration of the braking force command to reduce the wheel slip.

That is, the control of the braking force applied to each drive wheel side may be performed according to the calibrated braking force command.

Here, the braking device may be a friction braking device or a regenerative braking device.

At braking of the vehicle, load is transferred to the front wheel side, and accordingly, the normal braking force ratio of the front wheel and the rear wheel is about 7:3.

However, when the slip is generated in this situation, it is difficult to secure longitudinal/lateral grip force, and accordingly, it is highly likely that a dangerous situation will ensue.

Accordingly, at braking, it is a priority to minimize the slip of the rear wheel in order to prevent the oversteer phenomenon.

However, unlike at operation, the purposes of both the performance priority and the stability priority at braking coincide, that is, minimizing the slip of the rear wheel, and this is because as the load transfer at braking occurs towards the front wheel side, the performance goal at braking coincides with the stability goal in terms of maximizing the grip force of the front wheel.

Accordingly, at braking, the slip control of the rear wheel is conservatively performed in order to maximize the grip force of the front wheel, and the rear wheel speed obtained at this time is determined to be the speed of the vehicle wheel that is less likely to cause the slip, and based on the above, the front wheel slip control is performed in the state where the calibration has been performed.

That is, the first calibration gain, which is the braking force calibration gain based on the equivalent inertia of the front wheel, is set to be smaller than the second calibration gain, which is the braking force calibration gain of the rear wheel side (the rear wheel side calibration amount is set to be larger than the front wheel side calibration amount), and the slip control of the front wheel side is performed at the reference vehicle speed determined by using the rear wheel speed or the lowest wheel speed in a state where the calibration has been performed.

In addition, as in at operation, the calibration gains of the front wheel side and the rear wheel side are changed in real time, and the difference therebetween may increase as the braking force command increases.

Referring to FIG. 2, in a state where the driver has operated the brake pedal at a certain level or more, that is, at braking in which the acceleration pedal input value is the first setting value or less and the brake pedal input value is larger than the second setting value, it may be seen that the first calibration gain and the second calibration gain are determined as the calibration gain value at braking, respectively, and subsequently, the individual wheel slip control based on the equivalent inertia of the front wheel side and the rear wheel side using each of the determined calibration gains is performed.

In addition, as shown in FIG. 2, when the accelerator pedal input value is the first setting value or less and at the same time, the brake pedal input value is the second setting value or less, the first calibration gain and the second calibration gain are determined as predetermined basic initial values and then, the individual wheel slip control based on the equivalent inertia of the front wheel side and the rear wheel side using the determined basic initial value is performed.

The wheel slip control process, that is, the process of reducing the wheel slip of the drive wheel and securing the grip force through the suppression of the driving force or the braking force command of the vehicle wheel, acts in the direction of always reducing the magnitude of the torque.

Accordingly, when only the torque reduction is considered in the wheel slip control, the problem is that the total driving force and braking force intended by the driver cannot be secured.

Accordingly, when reducing the magnitude of a torque for the slip control, the sum of torques may be maintained at the intended level by increasing the torques in the other vehicle wheels by the reduced amount of torque.

At this time, for example, in the case of reducing the torque of a first vehicle wheel and increasing the torque of a second vehicle wheel, which has already been slipped, in order to reduce the slip generated in the first vehicle wheel, the slip of the second vehicle wheel is increased, thereby failing to achieve the original purpose and function of the control.

Accordingly, whether an increase in the torque of the other wheels is possible should be determined based on the real-time equivalent inertia change amount of each controllable vehicle wheel.

At this time, the vehicle wheel with the smallest equivalent inertia change amount has a high weighted value and bears the increase in torque, and the weighted values between the vehicle wheels may be determined by a predetermined value.

In addition, when all the vehicle wheels exceed a predetermined threshold of the equivalent inertia change amount, the torque reduced due to the calibration is eliminated without increasing in the other wheels.

FIG. 3 shows a process of varying the calibration gain of the front wheel side and the calibration gain of the rear wheel side at operation (acceleration) of the vehicle according to an exemplary embodiment of the present disclosure.

When the driver's accelerator pedal input value is larger than the first setting value, the controller 20 compares the first equivalent inertia change amount, which is the real-time equivalent inertia change amount of the front wheel side, with the second equivalent inertia change amount, which is the real-time equivalent inertial change amount of the same time.

Here, when the first equivalent inertia change amount of the front wheel side is larger than the second equivalent inertia change amount of the rear wheel side, the controller 20 performs the upward gain calibration that increases the first calibration gain of the front wheel side, that is, increases the first calibration gain by a predetermined amount or according to a predetermined method.

At this time, when the difference of the equivalent inertia change amount obtained by subtracting the second equivalent inertia change amount from the first equivalent inertia change amount is a positive value, for example, when the difference of the equivalent inertia change amount is larger than a predetermined positive value, it is understeer of the vehicle, thus increasing the first calibration gain.

As described above, the upward calibration of the first calibration gain is performed so that the first calibration gain becomes larger than the second calibration gain.

In this case, the first calibration gain may be obtained by a function of the difference of the equivalent inertia change amount, or may be obtained by using a map based on the difference of the equivalent inertia change amount.

Subsequently, the individual wheel slip control based on the equivalent inertia using the calibration gain determined as described above is performed, and the TCS control of the front wheel side is performed at the reference speed determined by using the rear wheel speed or the lowest vehicle wheel speed in the state where the calibration has been performed after the transient period.

On the other hand, when the first equivalent inertia change amount of the front wheel side is smaller than the second equivalent inertia change amount of the rear wheel side, the controller 20 performs the upward gain calibration that increases the second calibration gain of the rear wheel side, that is, increases the second calibration gain by a predetermined amount or according to a predetermined method.

At this time, when the difference of the equivalent inertia change amount obtained by subtracting the second equivalent inertia change amount from the first equivalent inertia change amount is a negative value, preferably, when the difference of the equivalent inertia change amount is larger than a predetermined negative value, it is oversteer of the vehicle, thus increasing the second calibration gain.

As described above, the upward calibration of the second calibration gain is performed so that the second calibration gain becomes larger than the second calibration gain.

In this case, the second calibration gain may be obtained by a function of the difference of the equivalent inertia change amount, or may be obtained by using a map based on the difference of the equivalent inertia change amount.

Subsequently, the individual wheel slip control based on the equivalent inertia using the calibration gain determined as described above is performed, and the TCS control of the rear wheel side is performed at the reference speed determined by using the front wheel speed or the lowest vehicle wheel speed in the state where the calibration has been performed after the transient period.

FIG. 4 is a diagram schematically showing a control process of securing a total driving force intended by the driver at operation (acceleration) of the vehicle.

When the driver's accelerator pedal input value is larger than the first setting value, the controller 20 may determine whether the equivalent inertia value is reduced and the torque due to the calibration is reduced in the driving device for driving the vehicle when the individual wheel slip control based on the equivalent inertia is performed, and determines whether there is a driving device in which the equivalent inertia value has not been reduced when the equivalent inertia is reduced and the torque is reduced.

Here, when there is a driving device in which the equivalent inertia value has not been reduced, the torque of the driving device in which the equivalent inertia value has not been reduced is increased by the reduced amount of the torque of the driving device in which the equivalent inertia has been reduced.

FIGS. 7 and 8 are diagrams showing control state of a Comparative Example and an Exemplary Embodiment, respectively, in which the Comparative Example is an example in which the conventional slip limit control based on wheel speed difference is performed, and the Exemplary Embodiment is an example in which the individual wheel slip limit control based on the equivalent inertia of the vehicle is performed.

In FIGS. 7 and 8, the top graph shows the driving force (torque) command on the front wheel side and the driving force command on the rear wheel side before calibration, the second graph from the top of FIG. 7 shows the front wheel speed and the rear wheel speed, and the second graph from the top of FIG. 8 shows the measured value and the observed value of the front wheel speed and the rear wheel speed.

In addition, the third graph from the top of FIG. 7 shows the wheel slip amount of the front wheel and the wheel slip amount of the rear wheel, and the third graph from the top of FIG. 8 shows the wheel slip amount of the front wheel, the equivalent inertia change amount of the front wheel side, and the equivalent inertia change amount of the rear wheel side calculated when the rear wheel speed has been used as the reference speed.

In addition, the bottom graph of FIGS. 7 and 8 show the calibrated driving force commands of the front wheel side and the rear wheel side.

As shown in FIG. 7, in the Comparative Example, when both the front wheel and the rear wheel are the drive wheels a section where the driving force (torque) calibration is impossible is generated as shown in the bottom graph if the wheel slip amounts are largely generated in the front wheel and the rear wheel at the same time.

On the other hand, in the Exemplary Embodiment, as shown in FIG. 8, a control for reducing the driving force (torque) of each driving device by the front wheel side equivalent inertia change amount and the rear wheel side equivalent inertia change amount may be performed, and as a result, it is possible to obtain the control result of suppressing the wheel slip with respect to all the drive wheels of the front wheel and the rear wheel.

As described above, according to the method for controlling the wheel slip of the present disclosure, it is possible to perform the individual wheel slip control for each drive wheel in the vehicle having the plurality of driving devices, thereby improving the behavioral stability of the vehicle.

According to the method for controlling the wheel slip of the present disclosure, since the wheel slip control is performed based on the equivalent inertia, the reference speed is unnecessary, such that it is possible to apply it to each driving device or drive wheel individually.

For example, when there is one driving device for each vehicle wheel, it is possible to individually control the wheel slip generated in the four vehicle wheels, respectively, thereby not requiring any dynamics model.

In addition, in the present disclosure, it is possible to diversify the vehicle behavior according to the driver's propensity and the setting value by using the above-described features, and this may be performed through the strategy of varying the driving force calibration gain based on the equivalent inertia in real time.

Further, it is possible to reduce the slip of the vehicle wheel in advance before the function of the Electronic Stability Program (ESP) previously applied to the vehicle is operated, thereby securing the driving performance.

As described above, although the exemplary embodiments of the present disclosure have been described in detail, the claims of the present disclosure are not limited to the above-described embodiments, and various modifications and improvements by those skilled in the art using the basic concept of the present disclosure defined in the appended claims may also be included the claims of the present disclosure.

What is claimed is:

1. A method for controlling wheel slip of a vehicle, which has a plurality of driving devices for generating driving force for driving the vehicle, the method comprising:
    obtaining, by a controller, equivalent inertia information for driving system of each driving device among the plurality of driving devices in real time, based on operation information of each driving system during traveling of the vehicle, wherein the equivalent inertia information is calculated from an angular acceleration obtained from a speed of the driving system and torque information transferred through the corresponding driving system;
    calculating, by the controller, a calibration amount for calibrating a driving force command or a braking force command for each wheel by using the equivalent inertia information for each driving system obtained in real time, wherein the equivalent inertia information for each driving system for calculating the calibration amount includes a real-time equivalent inertia change amount of each driving system, and the calibration amount is calculated by applying a calibration gain to the real-time equivalent inertia change amount;
    recognizing, by the controller, a control mode selected, among a performance priority mode and a stability priority mode, by a driver;
    calibrating, by the controller, the driving force command or the braking force command for each wheel by using the calibration amount; and
    controlling, by the controller, a driving force applied to each wheel according to the calibrated driving force command or controlling a braking force applied to each wheel according to the calibrated braking force command,
    wherein the obtaining of the equivalent inertia information, the calculating of the calibration amount, the calibrating of the driving force command or the braking force command, and the controlling of the driving force applied or the braking force applied are performed in a transient section, and
    wherein the transient section is a transitional section from a normal traveling state to a state where traction control system operating condition is satisfied and requires traction control system operation,
    wherein the vehicle is a front and rear wheel drive vehicle having a front wheel driving device and a rear wheel driving device,
    wherein, when an accelerator pedal input value is larger than a first setting value and the performance priority mode has been selected, the controller determines that a front wheel calibration gain for determining the calibration amount of the front wheel driving force command is a value larger than a rear wheel calibration gain for determining the calibration amount of the rear wheel driving force command, and
    wherein the controller increases a difference between the front wheel calibration gain and the rear wheel calibration gain as the front wheel and the rear wheel driving force commands increase.

2. The method of claim 1, wherein, in a state where a control of the driving force applied to each wheel has been performed according to the calibrated driving force command of each wheel, the controller performs a rear wheel slip control at a reference vehicle speed determined by using a front wheel speed or a lowest vehicle wheel speed.

3. The method of claim 1, wherein, when the accelerator pedal input value is larger than the first setting value and the stability priority mode has been selected, the calibration amount for calibrating the front wheel driving force command is calculated to be a value smaller than the calibration amount for calibrating the rear wheel driving force command.

4. The method of claim 3, wherein, when the accelerator pedal input value is larger than the first setting value and the stability priority mode has been selected, the controller determines that a front wheel calibration gain for determining the calibration amount of the front wheel driving force command is smaller than a rear wheel calibration gain for determining the calibration amount of the rear wheel driving force command.

5. The method of claim 4, wherein the controller increases a difference between the front wheel calibration gain and the rear wheel calibration gain as the front and rear wheel driving force commands increase.

6. The method of claim 3, wherein, in a case that the stability priority mode has been selected and the driving force applied to each wheel has been controlled according to the calibrated driving force command, the controller performs a front wheel slip control at a reference vehicle speed determined by using a rear wheel speed or a lowest vehicle wheel speed.

7. The method of claim 1, wherein, when a brake pedal input value is larger than a second setting value, the controller calculates the calibration amount for calibrating the braking force command of each wheel from the equivalent inertia information for each driving system obtained in real time, and calibrates the braking force command for each wheel by using the calculated calibration amount.

8. The method of claim 7, wherein, when the brake pedal input value is larger than the second setting value, the calibration amount for calibrating a front wheel braking force command is calculated to be a value smaller than the calibration amount for calibrating a rear wheel braking force command.

9. The method of claim 8, wherein, when the brake pedal input value is larger than the second setting value, the controller determines that a front wheel calibration gain for determining the calibration amount of the front wheel braking force command is smaller than a rear wheel calibration gain for determining the calibration amount of the rear wheel braking force command.

10. The method of claim 9, wherein the controller increases a difference between the front wheel calibration gain and the rear wheel calibration gain as the front and rear wheel braking force commands increase.

11. The method of claim 7, wherein in a state where the control of the braking force applied to each wheel has been performed according to the calibrated braking force command, the controller performs a front wheel slip control at a reference vehicle speed determined by using a rear wheel speed or a lowest vehicle wheel speed.

12. The method of claim 1, wherein the operation information of each driving system includes a torque command of a previous control period for the driving device of each wheel and speed information of each wheel driving system.

13. The method of claim 12, wherein the speed information of the driving system includes at least one of a speed of the wheel, a speed of each driving device, a rotational speed of a transmission input shaft, or a rotational speed of a transmission output shaft.

14. The method of claim 1, wherein in the controlling, the controller applies a sum of the driving force corresponding to the calibration amount of the driving force command or the braking force corresponding to the calibration amount of the braking force command for one wheel to another wheel.

15. The method of claim 14, wherein the sum of the driving force or the braking force is determined based on the real-time equivalent inertia change amount of the another wheel.

16. The method of claim 1, comprising changing the first calibration gain of the front wheel side and the second calibration gain of the rear wheel side in real time.

* * * * *